United States Patent
Moritz et al.

(10) Patent No.: US 7,122,161 B1
(45) Date of Patent: Oct. 17, 2006

(54) TAYLOR REACTOR FOR MATERIALS CONVERSION IN THE COURSE OF WHICH A CHANGE IN VISCOSITY OF THE REACTION MEDIUM OCCURS

(75) Inventors: Hans-Ulrich Moritz, Bemdesdorf (DE); Sabine Kossak, Buchholz (DE); Jessica Langenbuch, Barsbüttel (DE); Heinz-Peter Rink, Münster (DE); Werner Alfons Jung, Ascheberg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/719,874

(22) PCT Filed: Jun. 23, 1999

(86) PCT No.: PCT/EP99/04370

§ 371 (c)(1),
(2), (4) Date: Jan. 4, 2001

(87) PCT Pub. No.: WO00/00280

PCT Pub. Date: Jan. 6, 2000

(30) Foreign Application Priority Data

Jun. 27, 1998 (DE) ................. 198 28 742

(51) Int. Cl.
*B01F 7/00* (2006.01)
(52) U.S. Cl. ............ 422/209; 422/215; 422/224; 422/225; 422/229
(58) Field of Classification Search ............. 422/209, 422/211, 213, 215, 224, 225, 229
See application file for complete search history.

(56) References Cited

U.S. PATENT DOCUMENTS

| | | | |
|---|---|---|---|
| 4,174,907 A | 11/1979 | Suh et al. ............ 366/279 |
| 4,553,922 A | 11/1985 | Winner | |
| 5,188,808 A * | 2/1993 | Lilja et al. ............ 422/229 |
| 5,278,253 A | 1/1994 | Baumgartner et al. | |
| 5,576,386 A | 11/1996 | Kempter et al. | |
| 5,618,580 A | 4/1997 | Oshima et al. ........ 427/212 |
| 5,846,498 A * | 12/1998 | Kingsley ............ 422/227 |

FOREIGN PATENT DOCUMENTS

| | | |
|---|---|---|
| DE | 19960389 | 7/2001 |
| EP | 0 498 583 A1 | 1/1992 |
| GB | 799039 | 9/1956 |
| GB | 875 796 | 1/1957 |
| GB | 1 358 157 | 4/1970 |
| GB | 2 103 229 A | 7/1982 |
| GB | 2 215 327 A | 3/1988 |
| WO | WO94/11096 | 5/1994 |
| WO | WO98/22524 | 5/1998 |
| WO | WO00/00280 | 1/2000 |

\* cited by examiner

*Primary Examiner*—Len Tran

(57) ABSTRACT

A Taylor reactor for conducting material conversions, having an external reactor wall (1) located within which there is a concentrically or eccentrically disposed rotor (2), a reactor floor (3) and a reactor lid (4), which together define the annular reactor volume (5), at least one means (6) for metered addition of reactants, and a means (7) for the discharge of product, wherein during the conversion there is a change in the viscosity $\nu$ of the reaction medium and the reactor wall (1) and/or the rotor (2) are or is geometrically designed in such a way that the conditions for Taylor vortex flow are met over essentially the entire reactor length in the reactor volume (5).

19 Claims, 1 Drawing Sheet

Figure 1:
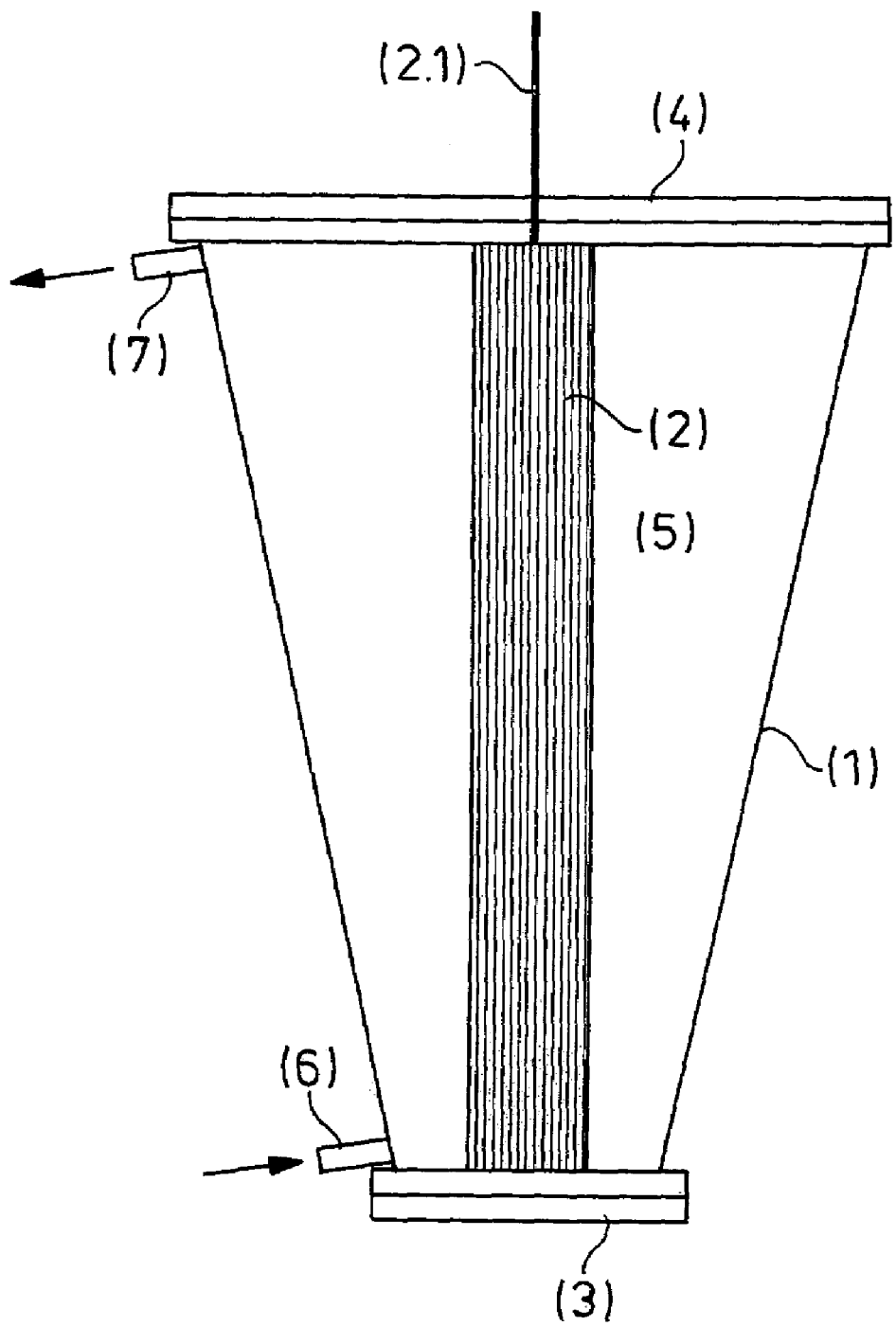

TAYLOR REACTOR FOR MATERIALS CONVERSION IN THE COURSE OF WHICH A CHANGE IN VISCOSITY OF THE REACTION MEDIUM OCCURS

This application is a National Phase Application of Patent Application PCT/EP99/04370 filed on 23, Jun. 1999

The present invention relates to a novel Taylor reactor for physical and/or chemical conversions in whose course there is a change in the viscosity v of the reaction medium. The present invention further relates to a novel process for conversion which is accompanied by a change in viscosity of the reaction medium under the conditions of Taylor vortex flow. The invention additionally relates to substances produced using the novel process in the novel Taylor reactor, and to their use.

Taylor reactors, which serve to convert substances under the conditions of Taylor vortex flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. As well as the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i d v^{-1} (d/r_i)^{1/2} \quad (I)$$

where $d = r_o - r_i$.

At low angular viscosity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric, possess the geometric form of a torus (Taylor vortex ring), and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

If the Taylor reactor is provided with an inlet and outlet and is operated continuously, the result is a Taylor vortex flow with a low axial flow. Each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

The Taylor reactors known to date may be used for emulsion polymerization. In this context, reference may be made by way of example to patents DE-B-1 071 241 and EP-A-0 498 583 or to the article by K. Kataoka in Chemical Engineering Science 50 (1995) 9, 1409 to 1416. They are also suitable for electrochemical processes, in which case the cylinders function as electrodes. In this context, reference may be made to the articles by S. Cohen and D. M. Maron in Chemical Engineering Journal 27 (1983) 2, 87 to 97, and by Couret and Legrand in Electrochimia Acta 26 (1981) 7, 865 to 872, and 28 (1983) 5, 611 to 617.

It is also known to use the Taylor reactors as photochemical reactors, in which the light source is located in the inner cylinder (cf. in this respect the articles by Szechowski in Chemical Engineering Science 50 (1995) 20, 3163 to 3173, by Haim and Pismen in Chemical Engineering Science 49 (1994) 8, 1119 to 1129, and by Karpel Vel Leitner in Water Science and Technology 35 (1997) 4, 215 to 222).

Their use as bioreactors (cf. in this respect the article by Huang and Liu in Water Science and Technology 28 (1994) 7, 153 to 158) or as flocculation reactors for wastewater purification (cf. in this respect the article by Grohmann in BMFT-FB-T 85-070, 1985) has also been described.

With all of these known conversions in Taylor reactors, there is absolutely no, or no significant, change in the viscosity v of the fluid. As a result, given a strictly cylindrical geometry of the inner and outer cylinders of the Taylor reactor, the conditions for Taylor vortex flow are maintained over the entire length of the annular gap, i.e., of the total reactor volume.

If, however, the known Taylor reactors are to be used for conversions where there is a substantial change in the viscosity v of the fluid in the axial flow direction as conversion progresses, the Taylor vortices disappear or are not even formed. In that case, Couette flow, a concentric, laminar flow, is observed in the annular gap, and there is an unwanted change in the mixing and flow conditions within the Taylor reactor. In this operating state it exhibits flow characteristics which are comparable with those of the laminarly flow-traversed tube, which is a considerable disadvantage. For example, in the case of addition polymerization in bulk or in solution, there is an undesirably broad molecular mass distribution and chemical polydispersity of the polymers. Moreover, the poor reaction routine may result in considerable amounts of residual monomers, which then have to be discharged from the Taylor reactor. However, there may also be instances of coagulation and polymer deposition, which in some cases may even lead to blockage of the reactor or of the product outlet. Undesired technical effects of this kind, or of a similar kind, also accompany the thermal degradation of the high molecular mass materials such as polymers, etc. Overall, it is no longer possible to obtain the desired products, such as polymers of very narrow molecular mass distribution, but only those whose profile of properties does not meet requirements.

It is an object of the present invention to propose a new Taylor reactor from which the disadvantages of the prior art are now absent and which instead makes it possible to conduct a simple, elegant, trouble-free and high-yield conversion of substances even when this conversion is accompanied by a substantial change in the viscosity v of the reaction medium.

A further object of the present invention is to find a new process for material conversion under the conditions of Taylor vortex flow in the course of which there is a substantial change in the viscosity v of the fluid in the annular gap, i.e., of the reaction medium.

Accordingly, we have found the novel Taylor reactor for conducting material conversions, having a) an external reactor wall (1) located within which there is a concentrically or eccentrically disposed rotor (2), a reactor floor (3) and a reactor lid (4), which together define the annular reactor volume (5), b) at least one means (6) for metered addition of reactants, and c) a means (7) for the discharge of product, where d) during the conversion there is a change in the viscosity v of the reaction medium and e) the reactor wall (1) and/or the rotor (2) are or is geometrically designed in such a way that the conditions for Taylor vortex flow are met over essentially the entire reactor length in the reactor volume (5).

In the text below, the novel Taylor reactor for conducting conversions is referred to for short as the "Taylor reactor of the invention". Correspondingly, the novel process for converting materials under the conditions of Taylor vortex flow is referred to as the "process of the invention".

In the light of the prior art, it was surprising and unforeseeable for the skilled worker that by virtue of the geometric design of the reactor wall (1) and/or of the rotor (2), with axial flow of the reaction medium through the Taylor reactor, it is possible to retain the conditions of Taylor vortex flow over the entire reactor length even when there is a substantial change in the viscosity v of the reaction medium in the course of its passage through the annular gap.

The change in the viscosity v of the reaction medium may, in accordance with the invention, involve an increase or a decrease. Both changes may amount to several powers of ten in any individual case. An increase of this magnitude in the viscosity v occurs, for example, in the course of addition polymerization in bulk or in solution. Conversely, a decrease of such magnitude in the viscosity v results in the course of depolymerization. Even under these particularly demanding technical conditions, however, Taylor vortex flow is maintained in the Taylor reactor of the invention.

In the Taylor reactor of the invention, the external reactor wall (1) is stationary while the rotor (2) rotates. In a further variant, the external reactor wall (1) and the rotor (2) rotate in the same direction, the angular velocity of the rotor (2) being greater than the angular velocity of the external reactor wall (1). In another variant, the external reactor wall (1) and the rotor (2) rotate in opposite directions. Accordingly, the variant comprising the stationary external reactor wall (1) constitutes a special case of the second and third variant, which is, however, preferred owing to the simple construction and the considerably greater ease of technical monitoring.

The external reactor wall (1) and the rotor (2) have an essentially circular circumference over the entire reactor length, as viewed in cross section. In the context of the present invention, the term "essentially circular" means strictly circular, oval, elliptical or triangular, rectangular, square, pentagonal, hexagonal or polygonal with rounded angles. For reasons of greater facility of production, simplicity of construction, and the significantly simpler maintenance of constant conditions over the entire reactor length, a strictly circular circumference is of advantage.

In accordance with the invention, the internal wall of the external reactor wall (1) and/or the surface of the rotor (2) are or is smooth or rough, i.e., the surfaces in question have a low or high surface roughness. Additionally or alternatively, the internal wall of the external reactor wall (1) and/or the surface of the rotor (2) have or has a relieflike radial and/or axial, preferably radial, surface profile. If there is a radial surface profile, it is advantageously of approximately or precisely the same dimensions as the Taylor vortex rings.

In accordance with the invention it is preferred for the internal wall of the external reactor wall (1) and the surface of the rotor (2) to be smooth, in order to prevent dead corners into which gas bubbles or reactants and products might settle.

Viewed in the lengthwise direction, the Taylor reactor of the invention is mounted vertically, horizontally, or in a position between these two directions. In accordance with the invention, vertical mounting is advantageous. If the Taylor reactor of the invention is not mounted horizontally, it may be traversed by the reaction medium flowing against gravity, from bottom to top, or with gravity, from top to bottom. In accordance with the invention it is of advantage if the reaction medium is moved counter to gravity.

The rotor (2) of the Taylor reactor of the invention is mounted centrically or eccentrically. That is, its longitudinal axis coincides (centrically) or not (eccentrically) with the longitudinal axis of the external reactor wall (1). In the latter case, the longitudinal axis of the rotor (2) may lie parallel to the longitudinal axis of the external reactor wall (1) or may be inclined at an acute angle relative to it. In accordance with the invention it is of advantage if the rotor (2) is mounted centrically.

As further essential constituents, the Taylor reactor of the invention comprises a reactor floor (3) and a reactor lid (4), which together with the external reactor wall (1) and the rotor (2) define the annular reactor volume (5) and provide pressuretight and gastight sealing thereof with respect to the outside. Suitable reactor floors (3) and reactor lids (4) are customary and known; by way of example, reference may be made to patents DE-B-1 071 241 and EP-A-0 498 583.

As a further essential constituent, the Taylor reactor of the invention further comprises at least one customary and known means (6) for metered addition of reactants. An example of an appropriate means (6) is a nozzle of appropriate cross section. The means (6) may be installed in the reactor floor (3), the reactor lid (4), the external reactor wall (1), or the rotor (2). Additionally, the Taylor reactor of the invention may comprise at least one further means (6) disposed at the same height as the first or offset from it in the flow direction. A further such means (6) is especially advantageous when there is to be subsequent metering of reactants and/or catalysts. Normally, the means (6) are connected via appropriate lines to metering pumps, reservoir vessels, etc.

A further essential constituent of the Taylor reactor of the invention is the means (7) for the discharge of the products. Depending on the circumstances, the means (7) is installed in the reactor floor (3), the external reactor wall (1), or the reactor lid (4). It too is usually connected via appropriate lines to metering pumps, reservoir vessels, etc. In accordance with the invention it is of particular advantage to dispose the means (7) at the top end of the Taylor reactor of the invention, with particular preference being given to the highest point, since with this configuration the formation of a gas phase is prevented. This is particularly necessary when there is a risk of formation of explosive mixtures or of the deposition of solids such as polymers from the gas phase.

The constituents of the Taylor reactor of the invention, especially external reactor wall (1), the rotor (2), the reactor floor (3), the reactor lid (4), the means (6) for metered addition of reactants, and the means (7) for the discharge of products, may consist of any of a wide variety of appropriate materials. Examples of suitable materials are plastic, glass or metals such as stainless steel, nickel or copper. The individual constituents may each have been produced from different materials. The selection of the materials is guided by the intended use of the Taylor reactor of the invention and by the specific reaction conditions and may therefore be carried out in a simple manner by the skilled worker. Where, for example, the Taylor reactor of the invention is to be used as a photoreactor, the rotor (2) may consist of glass which is transparent to actinic light. If there is to be visual monitoring of the Taylor vortex rings and their axial motion during the conversions, it is of advantage in accordance with the invention to manufacture the external reactor wall (1) from glass or transparent plastic. Such Taylor reactors of the invention are also outstandingly suitable for conducting preliminary experiments. Otherwise, it is of advantage in accordance with the invention to use stainless steel.

The rotor (2) is connected to an infinitely adjustable drive in a customary and known manner, by way of a magnetic coupling, for example.

Apart from the essential constituents described in detail above, the Taylor reactor of the invention may also comprise customary and known means serving for heating and/or cooling or for measuring pressure, temperature, concentration, viscosity, and other physicochemical variables, and may also be connected to customary and known mechanical, hydraulic and/or electronic measurement and control devices.

All of these constituents of the Taylor reactor of the invention are connected to one another in such a way that the reaction medium is enclosed in a pressuretight and gastight way and is appropriately thermally conditioned. Thermal conditioning takes place advantageously in one or more temperature zones which are operated in cocurrent or in countercurrent.

Where the Taylor reactor of the invention is used for the process of the invention in which the viscosity v of the reaction medium increases sharply in the flow direction, the external reactor wall (1) and/or the rotor (2) are geometrically designed in such a way that the annular gap widens in the flow direction.

In this case, in accordance with the invention, the annular gap—viewed in longitudinal section through the Taylor reactor of the invention—may widen continuously or discontinuously in accordance with any desired suitable mathematical function. The extent of the widening is guided by the expected increase in the viscosity of the reaction medium in the flow direction and may be estimated by the skilled worker on the basis of the Taylor formula and/or determined by means of simple preliminary experiments.

Examples of suitable mathematical functions in accordance with which the circumference of the external reactor wall (1) and/or of the rotor (2) increase or increases— viewed in longitudinal section through the Taylor reactor of the invention—are straight lines, at least two straight lines which intersect one another at an obtuse angle, hyperbolas, parabolas, e functions, or combinations of these functions with continuous or discontinuous transitions between them.

First, the widening may be achieved by an increase in the circumference of the external reactor wall (1) as seen in the flow direction, the circumference of the rotor (2) remaining constant, likewise increasing, or reducing. Secondly, it may be achieved by keeping the diameter of the external reactor wall (1) constant while reducing the circumference of the rotor (2). In view of the fact that if the circumference of the rotor (2) is reduced the area for the transfer of the frictional forces becomes smaller and smaller and, therefore, the rotor (2) would have to rotate faster and faster, preference is given to those variants of the invention wherein the circumference of the rotor (2) remains constant or likewise increases.

Advantageous Taylor reactors of the invention have a conical external reactor wall (1) which, accordingly, has the form of a single frustum or is composed of a plurality of frusta. The frustum or frusta may have a pillow-shaped or barrel-shaped distortion. However, undistorted frusta are particularly preferred.

Advantageous Taylor reactors of the invention further comprise a conical or cylindrical rotor (2). Regarding the form of the conical rotor (2), the comments made in the preceding paragraph apply mutatis mutandis. Similarly, the cylindrical rotor (2) may have a pillow-shaped or barrel-shaped distortion. In accordance with the invention, undistorted cylindrical rotors (2) are used with particular preference.

Where the Taylor reactor of the invention is used for the process of the invention in which the viscosity v of the reaction medium decreases sharply in the flow direction, the external reactor wall (1) and/or the rotor (2) may be geometrically designed in such a way that the annular gap narrows in the flow direction.

In this case, in accordance with the invention, the annular gap—viewed in longitudinal section through the Taylor reactor of the invention—may narrow continuously or discontinuously in accordance with any desired suitable mathematical function. The extent of the narrowing is guided by the expected decrease in the viscosity of the reaction medium in the flow direction and may be estimated by the skilled worker on the basis of the Taylor formula (I) and/or determined by means of simple preliminary experiments.

Examples of suitable mathematical functions in accordance with which the circumference of the external reactor wall (1) and/or of the rotor (2) decrease or decreases— viewed in longitudinal section through the Taylor reactor of the invention—are straight lines, at least two straight lines which intersect one another at an obtuse angle, hyperbolas, parabolas, e functions, or combinations of these functions with continuous or discontinuous transitions between them.

First, the narrowing may be achieved by a reduction in the circumference of the external reactor wall (1) as seen in the flow direction, the circumference of the rotor (2) remaining constant, increasing or likewise reducing. Secondly, it may be achieved by keeping the diameter of the external reactor wall (1) constant while increasing the circumference of the rotor (2). In view of the fact that if the circumference of the rotor (2) is reduced the area for the transfer of the frictional forces becomes smaller and smaller and, therefore, the rotor (2) would have to rotate faster faster, preference is given to those variants of the invention wherein the circumference of the rotor (2) remains constant or likewise increases.

Here too, advantageous Taylor reactors of the invention have a conical external reactor wall (1) which, accordingly, has the form of a single frustum or is composed of a plurality of frusta. The frustum or frusta may have a pillow-shaped or barrel-shaped distortion. However, undistorted frusta are particularly preferred.

Advantageous Taylor reactors of the invention further comprise a conical or cylindrical rotor (2). Regarding the form of the conical rotor (2), the comments made in the preceding paragraph apply mutatis mutandis. Similarly, the cylindrical rotor (2) may have a pillow-shaped or barrel-shaped distortion. In accordance with the invention, undistorted cylindrical rotors (2) are used with particular preference.

The Taylor reactor of the invention is ideally suited to conducting the process of the invention. The process of the invention may be operated continuously or batchwise; its particular advantages, however, become apparent in the case of continuous operation.

To conduct the process, the reactant or reactants is or are metered continuously to the annular reactor volume (5) by way of at least one means (6). The resultant products are removed continuously from the Taylor reactor of the invention by way of the means (7) and are worked up appropriately.

In the process of the invention, the residence time in the reactor is between 0.5 minutes and 5 hours, preferably 2 minutes and 3 hours, with particular preference 10 minutes and 2 hours, and in particular 15 minutes and 1.5 hours. The appropriate residence time for the conversion in question may be determined by the skilled worker on the basis of simple preliminary experiments or estimated on the basis of kinetic data.

The pressure in the annular reaction body (5) is from 0 to 200 bar, and so the process of the invention may also be performed with liquefied or supercritical gases, such as supercritical carbon dioxide. Preferably, the pressure is from 0.5 to 100 bar, in particular from 0.5 to 50 bar. Where the process of the invention is conducted at a relatively high pressure, the Taylor reactor of the invention, and its incoming and outgoing lines, must be given a pressuretight design in order to meet the safety provisions.

The process of the invention is conducted at temperatures between −100 and 500° C. For this purpose, the Taylor reactor of the invention is equipped with suitable, customary and known cooling and/or heating means. Preferably, the reaction temperatures are between −10 and 300° C., in particular 50 and 250° C. The temperature appropriate for the conversion in question may be determined by the skilled worker on the basis of simple preliminary experiments or estimated on the basis of known thermodynamic data.

Advantageously, the Taylor number Ta of the reaction medium or of the fluid is from 1 to 10,000, preferably from 5 to 5000, and in particular from 10 to 2500. At the same time the Reynolds number, which is defined by equation (II) below, should be from 1 to 10,000.

$$Re = vd/v \quad \text{(II)}$$

where v is the axial velocity and $d=r_o-r_i$ ($r_i$=external radius of the inner cylinder; $r_o$=internal radius of the outer cylinder, and d=gap width).

In the process of the invention, there is a change in the viscosity v of the reaction medium. This viscosity v may increase or fall. The change may amount of several powers of ten, without disrupting the conduct of the process of the invention. All that is needed is to ensure that the annular gap of the Taylor reactor of the invention widens or narrows in correspondence with the change in viscosity in the course of the conversions, so that Taylor vortex flow is maintained in the entire reactor. The course of the change in velocity may be determined by the skilled worker on the basis of simple preliminary experiments.

A very particular advantage of the Taylor reactor of the invention and of the process of the invention is to link the spatial succession in the Taylor reactor with the temporal succession of batchwise or semicontinuous (metering) processes. The Taylor reactor of the invention and the process of the invention therefore provide the advantage of a continuous, quasi-"single-stage" process, so that a first reaction may take place in the first flow-traversed subsection of the Taylor reactor and a second, third, etc. reaction in a second or further subsection—as viewed in the axial flow direction—downstream of one further means (6) for metering in reactants and/or catalysts.

Examples of conversions for which the process of the invention may be employed for particular advantage are, in particular, the buildup or breakdown of substances of low and high molecular mass, such as the polymerization of monomers in bulk, solution, emulsion or suspension, or by precipitation polymerization, on the one hand, and the depolymerization of the resultant polymers, or other high molecular mass materials, on the other. In the context of the present inventions, the term "polymerization" embraces not only addition polymerization, copolymerization and block copolymerization but also polycondensation and polyaddition.

Further examples of such conversions are
  polymer-analogous reactions, such as the esterification, amidation or urethanization of polymers containing side groups suitable for such reactions,
  the preparation of olefinically unsaturated materials curable using electron beams or ultraviolet light,
  the preparation of polyurethane resins and modified polyurethane resins such as acrylated polyurethanes,
  the preparation of (poly)ureas or modified (poly) ureas,
  the molecular weight buildup of compounds terminated by isocyanate groups,
  or reactions which lead to the formation of mesophases, as described, for example, by Antonietti and Göltner in the article "Überstruktur funktioneller Kolloide: eine Chemie im Nanometerbereich [Superstructure of functional colloids: A chemistry in the nanometer range]" in Angewandte Chemie 109 (1997) 944 to 964 or by Ober and Wengner in the article "Polyelectrolyte-Surfactant Complexes in the Solid State: Facile Building Blocks for Self-Organizing Materials" in Advanced Materials, 9 (1997) 1, 17 to 31.

With very particular advantage, the process of the invention is employed for the polymerization of olefinically unsaturated monomers, since in this case the particular advantages of the Taylor reactor of the invention and of the process of the invention are manifested with particular clarity.

Accordingly, the process of the invention is used with particular preference for the preparation of copolymers of chemically uniform composition. In this utility, the more rapidly polymerizing comonomer or comonomers is or are metered in by way of means (6) disposed in succession in the axial direction, so that the comonomer ratio is kept constant over the entire length of the reactor.

The process of the invention is also used with particular preference for graft copolymerization. In this utility, in the first subsection of the Taylor reactor of the invention, the backbone polymer is prepared, after which at least one comonomer which forms the graft branches is metered in by way of at least one further means (6), offset in the axial direction. Subsequently, in accordance with the invention, the comonomer or comonomers is or are grafted onto the backbone polymer in at least one further subsection of the Taylor reactor of the invention. Where two or more comonomers are used, they may be metered in individually by way of one means (6) in each case or as a mixture, by one or more means (6). Where at least two comonomers are metered in individually and in succession by at least two means (6), it is even possible to prepare graft branches which per se are block copolymers, in a particularly simple and elegant manner.

Of course, this concept as described above may also be used to prepare block copolymers per se.

Analogously, the preparation of core/shell latices may be realized in a particularly simple and elegant manner with the aid of the process of the invention. Initially, in the first subsection of the Taylor reactor of the invention, the core is prepared by polymerizing at least one monomer. By way of at least one further means (6), at least one further comonomer is metered in and the shell is polymerized onto the core in at least one further subsection. In this way it is possible to apply a plurality of shells to the core.

The preparation of polymer dispersions may also take place with the aid of the process of the present invention. For example, at least one monomer in a homogeneous phase, especially in solution, is (co)polymerized in a first subsection of the Taylor reactor of the invention, after which a precipitant is metered in by way of at least one further means (6), resulting in the polymer dispersions.

For all applications, the Taylor reactor of the invention has the particular advantage of a large specific cooling area which allows a particularly safe reaction regime.

Examples of monomers suitable for the process of the invention are acyclic and cyclic, unfunctionalized and functionalized monoolefins and diolefins, vinylaromatic compounds, vinyl ethers, vinyl esters, vinyl amides, vinyl halides, allyl ethers and allyl esters, acrylic acid and methacrylic acid and their esters, amides and nitriles, and maleic acid, fumaric acid and itaconic acid and their esters, amides, imides and anhydrides.

Examples of suitable monoolefins are ethylene, propylene, 1-butene, 1-pentene, 1-hexene, 1-heptene, 1-octene, cyclobutene, cyclopentene and cyclohexene.

Examples of suitable diolefins are butadiene, isoprene, cyclopentadiene and cyclohexadiene.

Examples of suitable vinylaromatic compounds are styrene, alpha-methylstyrene, 2-, 3- and 4-chloro-, -methyl-, -ethyl-, -propyl- and -butyl- and -tert-butylstyrene and -alpha-methylstyrene.

An example of a suitable vinyl compound or of a functionalized olefin is vinylcyclohexanediol.

Examples of suitable vinyl ethers are methyl, ethyl, propyl, butyl and pentyl vinyl ether, allyl monopropoxylate, and also trimethylolpropane monoallyl, diallyl and triallyl ether.

Examples of suitable vinyl esters are vinyl acetate and vinyl propionate and also the vinyl esters of Versatic acid and of other quaternary acids.

Examples of suitable vinyl amides are N-methyl-, N,N-dimethyl-, N-ethyl-, N-propyl-, N-butyl-, N-amyl-, N-cyclopentyl- and N-cyclohexylvinylamide and also N-vinylpyrrolidone and epsilon-caprolactam.

Examples of suitable vinyl halides are vinyl fluoride and vinyl chloride.

Examples of suitable vinylidene halides are vinylidene fluoride and vinylidene chloride.

Examples of suitable allyl ethers are methyl, ethyl, propyl, butyl, pentyl, phenyl and glycidyl monoallyl ether.

Examples of suitable allyl esters are allyl acetate and allyl propionate.

Examples of suitable esters of acrylic acid and methacrylic acid are methyl, ethyl, propyl, n-butyl, isobutyl, n-pentyl, n-hexyl, 2-ethylhexyl, isodecyl, decyl, cyclohexyl, t-butylcyclohexyl, norbornyl, isobornyl, 2- and 3-hydroxypropyl, 4-hydroxybutyl, trimethylolpropane mono-, pentaerythritol mono- and glycidyl (meth)acrylate. Also suitable are the di-, tri- and tetra(meth)acrylates of ethylene glycol, di-, tri- and tetraethylene glycol, propylene glycol, dipropylene glycol, butylene glycol, dibutylene glycol, glycerol, trimethylolpropane and pentaerythritol. However, they are used not alone but always in minor amounts together with the monofunctional monomers.

Examples of suitable amides of acrylic acid and methacrylic acid are (meth)acrylamide and also N-methyl-, N,N-dimethyl-, N-ethyl-, N-propyl-, N-butyl-, N-amyl-, N-cyclopentyl- and N-cyclohexyl(meth)-acrylamide.

Examples of suitable nitriles are acrylonitrile and methacrylonitrile.

Examples of suitable esters, amides, imides and anhydrides of maleic acid, fumaric acid and itaconic acid are dimethyl, diethyl, dipropyl and dibutyl maleate, fumarate and itaconate, maleamide, fumaramide and itaconamide, N,N'-dimethyl-, N,N,N',N'-tetra-methyl-, N,N'-diethyl-, N,N'-dipropyl-, N,N'-dibutyl-, N,N'-diamyl-, N,N'-dicyclopentyl and N,N'-dicyclohexyl-maleamide, -fumaramide and -itaconamide, maleimide, fumarimide and itaconimide, and N-methyl-, N-ethyl-, N-propyl-, N-butyl-, N-amyl-, N-cyclopentyl- and N-cyclohexyl-maleimide, -fumarimide and -itaconimide, and also maleic, fumaric and itaconic anhydride.

The monomers described above may be polymerized free-radically, cationically or anionically. Advantageously, they are polymerized free-radically. For this purpose, the customary and known inorganic free-radical initiators may be used, such as hydrogen peroxide or potassium peroxodisulfate, or the customary and known organic free-radical initiators, such as dialkyl peroxides, e.g., di-tert-butyl peroxide, di-tert-amyl peroxide and dicumyl peroxide; hydroperoxides, e.g., cumene hydroperoxide and tert-butyl hydroperoxide; per esters, e.g. tert-butyl perbenzoate, tert-butyl perpivalate, tert-butyl per-3,5,5-trimethylhexanoate and tert-butyl per-2-ethylhexanoate; bisazo compounds such as azobisisobutyronitrile; or C—C initiators such as 2,3-dimethyl-2,3-diphenyl-butane or -hexane. Also suitable, however, is styrene, which initiates polymerization thermally even without free-radical initiators.

The polymers prepared in accordance with the invention have particular advantages and are therefore outstandingly suitable for all applications as commonly envisaged for substances of high molecular mass of this kind, such as, for example, the production of moldings. In particular, however, they are suitable as components for paints, adhesives and other coating materials, and also films. In this case, they are used in particular as binders, since the paints, adhesives and other coating materials, and also the films, which comprise or consist of the binders prepared in accordance with the invention have particularly outstanding performance properties.

The particular advantages of the process of the invention are evident in particular from the paints which comprise the binders prepared in accordance with the invention. Depending on their composition, these paints are physically drying or are cured thermally, with actinic light, especially UV light, or by means of electron beams.

They are present as powder coating materials, powder slurry coating materials, coating materials dissolved in organic media, or aqueous coating materials. They may comprise color and/or effect pigments. They are used as architectural coatings for the interior and exterior sectors, as coating materials for furniture, windows, coils and other industrial applications, as automobile finishes for original equipment (OEM), or as automotive refinishes. In the context of their use in the automobile sector, they are suitable as electrodeposition coating materials, surfacers, basecoats, and clearcoats.

In all of these applications, the coating materials comprising the binders prepared in accordance with the invention are superior to the conventional coating materials.

The present invention is illustrated by the drawing (FIG. 1) and the example.

FIG. 1 Longitudinal section through a Taylor reactor of the invention with a conical external reactor wall (1) for visual monitoring of the Taylor vortex flow

EXAMPLE 1

The chain extension of partially hydrolyzed polyvinyl acetate (polyvinyl alcohol) with glutaraldehyde using a Taylor reactor of the invention and the process of the invention The chain extension of partially hydrolyzed polyvinyl acetate (hydroxyl group content: 88 mol %; acetate group content: 12 mol %) was carried out using the Taylor reactor of the invention in accordance with FIG. 1.

The Taylor reactor had a 25 cm high external reactor wall (1) made of glass, of strictly circular circumference, whose circumference and, respectively, diameter increased linearly along the reactor axis as viewed in the flow direction. Thus the minimum diameter of the external reactor wall (1) at the reactor floor (3) was 52 mm and the maximum diameter at the reactor lid (4) was 102 mm. The Taylor reactor of the invention further comprised a linear, centrically mounted, strictly cylindrical rotor (2) made of stainless steel, with a radius of 21 mm. As a result, there was an increase in the gap width d from 5 mm at the bottom end of the Taylor reactor to 30 mm at the top end. Via a straight shaft (2.1), which passed with sealing through the reactor lid (4), the rotor (2) was connected to an infinitely adjustable stirring motor. The reactor lid (4) and the reactor base (3) were of stainless steel; sealing between them and the corresponding end of the reactor wall (1) was effected by means of customary and known polymer gaskets. The means (6) for metered addition of the reactants and the means (7) for the discharge of product were glass advancers with threads, to which a feed hose and a discharge hose were fastened by means of coupling rings.

The Taylor reactor was fed continuously by way of the means (6) with a mixture of 4 parts of polyvinyl alcohol, 96.16 parts of water and 0.16 parts of glutaraldehyde with a volume flow of 33.3 ml/min.

Directly before entry into the Taylor reactor, 42% strength nitric acid was metered into the mixture by way of a separate pump, with a volume flow of 0.16 ml/min. The average residence time in the Taylor reactor was 30 min at a temperature of 22° C. The stirrer speed was 250 rpm. The viscosity of the starting material was 10 mm²/s. At the means (7), the solution of the chain extended polyvinyl alcohol had a viscosity of 47 mm²/s.

The material conversion, i.e., the reaction, was conducted in a total time of 5 h, corresponding to 10 average residence times. Throughout the Taylor reactor, the Taylor vortices and thus the desired mixing and flow conditions were maintained during this period, despite the increase in viscosity. It was therefore possible to conduct the reaction without disruption during the entire period of time.

EXAMPLE 2

The Preparation of a Solution Polymer in a Taylor Reactor of the Invention

A mixture of 15.8 parts of styrene, 16.5 parts of MMA, 11.6 parts of tert-butylcyclohexyl acrylate, 24.7 parts of hydroxypropyl methacrylate, 22.3 parts of Shellsol A, 7.4 parts of xylene, 0.3 part of di-tert-butylperoxide, 0.05 part of tert-butylperoxy-ethylhexanoate and 1.2 parts of dicumyl peroxide was metered using two pumps into a 200 ml conical stainless steel Taylor reactor with heatable jacket. The starting material was metered in at the reactor floor, while the resultant polymer was taken off continuously at the exit from the reactor, at the top in the reactor wall. The reaction was conducted at a temperature of 160° C. and with a stirrer speed of 300 min$^{-1}$. The average residence time of the reaction mixture in the reactor was 30 min. The resultant polymer melt had a solids content of 68.4% (1 h, 130° C.) and a viscosity of 3.0 dPas (50% strength in butyl acetate). Measurement of the polymer by gel chromatography gives an $M_n$ of 3215 and an $M_w$ of 8081. The glass transition temperature of the polymer was 69° C., determined by means of DSC from the DSC midpoint.

EXAMPLE 3

The Preparation of a Coating Material Using the Solution Polymer of Example 2

3.1 A curing agent solution was prepared by mixing the following components:

| | |
|---|---|
| butyl acetate 98% | 40.5 parts |
| xylene | 4.0 parts |
| butyl glycol acetate | 6.0 parts |
| catalyst solution (as per section 3.3) | 1.5 parts |
| Desmodur$^R$ Z4370[1] | 15.0 parts |
| Desmodur$^R$ 3390[2] | 33.0 parts |
| solids (% by weight) | 42.2 parts |

3.2 An adjustment additive was prepared by mixing the following components:

| | |
|---|---|
| xylene | 20.0 parts |
| solvent naphtha[3] | 15.0 parts |
| mineral spirit 135/180 | 10.0 parts |
| butyl glycol acetate | 5.0 parts |
| butyl acetate 98% | 50.0 parts |

3.3 A catalyst solution was prepared by mixing 1.0 parts of dibutyltin dilaurate and 99 parts of butyl acetate 98%

3.4 A leveling agent solution was prepared by mixing 5.0 parts of a commercial leveling agent based on a polyether-modified methylpolysiloxane (Baysilone$^R$ OL44[4]) and 95 parts by xylene.

3.5 A stock coating material was prepared by mixing the following components:

| | |
|---|---|
| butyl acetate | 4.0 parts |
| xylene | 4.15 parts |
| Tinuvin$^R$ 292[5] | 0.95 parts |
| Sanduvon$^R$ VSU[6] | 1.20 parts |

-continued

| | |
|---|---|
| catalyst solution (as per section 3.3) | 3.7 parts |
| leveling agent solution (as per section 3.4) | 2.0 parts |
| triisodecyl phosphite | 0.05 part |
| solution polymer (from Ex. 2) | 70.85 parts |
| Macrynal$^R$ SM513[7] | 13.1 parts |

[1] commercial polyisocyanate from Bayer AG, based on isophorone diisocyanate, with a solids content of 70%
[2] commercial polyisocyanate from Bayer AG, based on hexamethylene diisocyanate
[3] commercial aromatic hydrocarbon mixture from Shell GmbH
[4] commercial leveling agent from Bayer AG
[5] commercial light stabilizer from Ciba Geigy, based on a sterically hindered amine (HALS)
[6] commercial light stabilizer from Sandoz
[7] hydroxyl-containing acrylate resin from Bayer AG 180 parts of the stock coating material as per section 3.5 were mixed with 90 parts of curing agent solution as per section 3.1 and 16.2 parts of adjustment additive as per section 3.2, and the mixture was applied. The processing properties of the coating material were excellent. The pot life was 4 h. The pendulum attenuation of a 1 week old coating film dried at room temperature was 136 sec.

The resulting clearcoat was applied over a conventional basecoat of the Glasurit Reihe 55 brand. The coatings obtained by drying at 60° C. for 30 minutes had a gloss to DIN 67530 of 87°, measured at a 20° angle. The coatings had a good topcoat appearance.

What is claimed is:

1. A Taylor reactor for conducting material conversions, comprising:
   a) an annular reactor volume defined by an external reactor wall, a concentrically or eccentrically disposed rotor that extends the length of the reactor, a reactor floor, and a reactor lid,
   b) at least one means for metered addition of reactants into the annular reactor volume, and
   c) a means for the discharge of product from the annular reactor volume,
   wherein
   d) during a conversion within the annular reactor volume there is a change in a viscosity v of a reaction medium,
   e) one or more of the reactor wall and the rotor are geometrically designed such that the conditions for Taylor vortex flow are met over essentially the entire reactor length of the annular reactor volume,
   f) the reactor is not mounted horizontally, and the discharge means is mounted higher than the metered addition means so that a flow through the reactor is counter to gravity, and
   g) wherein the external reactor wall and the rotor rotate in the same direction, the angular velocity of the rotor being greater than that of the external reactor wall.

2. The Taylor reactor of claim 1, wherein the external reactor wall and the rotor have an essentially circular circumference over the entire reactor length, as viewed in cross section.

3. The Taylor reactor of claim 1, which is mounted vertically, the reaction medium being moved against gravity.

4. The Taylor reactor of claim 1, wherein the rotor is mounted centrically.

5. The Taylor reactor of claim 1, wherein the means for the discharge of the product is disposed at the highest point of the reactor lid.

6. The Taylor reactor of claim 1, wherein one or more of the external reactor wall and the rotor (2) are geometrically designed such that an annular gap widens in the flow direction.

7. The Taylor reactor of claim 6, wherein the circumference of the external reactor wall (1) increases in the flow direction.

8. The Taylor reactor of claim 6, wherein the external reactor wall has the form of a single frustum.

9. The Taylor reactor of claim 1, wherein one or more of the external reactor wall and the rotor are geometrically designed such that an annular gap narrows in the flow direction.

10. The Taylor reactor of claim 9, wherein the circumference of the external reactor wall (1) reduces in the flow direction.

11. The Taylor reactor of claim 9, wherein the external reactor wall has the form of a single frustum.

12. The Taylor reactor of claim 7, wherein the circumference of rotor (2) remains constant.

13. The Taylor reactor of claim 7, wherein the circumference of rotor (2) increases.

14. The Taylor reactor of claim 7, wherein the circumference of rotor (2) decreases.

15. The Taylor reactor of claim 6, wherein the external reactor wall is composed of a plurality of frusta.

16. The Taylor reactor of claim 10, wherein the circumference of the rotor remains constant.

17. The Taylor reactor of claim 10, wherein the circumference of the rotor increases.

18. The Taylor reactor of claim 10, wherein the circumference of the rotor decreases.

19. The Taylor reactor of claim 11, wherein the external reactor wall is composed of a plurality of frusta.

* * * * *